Patented Jan. 17, 1933

1,894,677

UNITED STATES PATENT OFFICE

LEWIS B. ESMOND, OF BOSTON, MASSACHUSETTS, AND WERNER W. DUECKER, OF PITTSBURGH, PENNSYLVANIA, ASSIGNORS TO ESSEX GELATINE COMPANY, OF BOSTON, MASSACHUSETTS, A CORPORATION OF MASSACHUSETTS

METHOD OF PREPARING EDIBLE EMULSIONS OF SOLID IN FAT AND PRODUCT THEREOF

No Drawing. Application filed January 15, 1931. Serial No. 509,028.

Our invention relates to the preparation of edible emulsions of solids in fats such as are employed as covering or coating materials in confectionery, cake icing, and the like, and consists in a modification in the composition and in the method of preparation, in consequence of which the material is stabilized and its quality is improved. This application is in part a continuation of an application filed by us October 1, 1928, Serial No. 309,689.

When chocolate or articles containing chocolate, such as chocolate-covered candy, are kept for some time under ordinary store conditions, or when such articles are kept under fluctuating conditions of temperature, the consistency changes; they tend to become granular; and soon lose their initial glossy, shiny appearance and become dull and aged, and their exposed surfaces seem to be covered with a thin white film or bloom. The bloom on chocolate is generally regarded as of two types. It is necessary, in the preparation of chocolate coating material to have, incorporated with the chocolate, a quantity of wax or fat, ordinarily cocoa butter, in an amount of approximately 30%; and it is thought that fluctuations of temperature cause some of the fat to crystallize and to appear on the surface as a thin white film. The second type of blooming is thought to be produced upon such articles as contain sugar, as all articles of confectionery do, and is thought to be produced after the articles have been exposed in an atmosphere of rather high humidity. The moisture in the air dissolves superficially the sugar in the chocolate; and, on subsequent evaporation, the sugar remains, crystalized upon the surface. The blooming of chocolate confectionery has hitherto been beyond control, and continues to be a cause of heavy losses to candy manufacturers.

In the practice of our invention we add to the chocolate in the course of its preparation, and according to a particular method of procedure, edible gelatine; and we have found that by following this procedure we obtain a product which is notably improved in quality; and is less liable to the bad effects of aging.

In the practice of our invention a quantity of chocolate liquor, such as is commonly employed in the manufacture of such articles, is placed in the melangeur and heated, approximately to 115° F. A quantity of gelatine which, to produce the intended good effect, may vary from 0.3% to 3.5% of the quantity of chocolate liquor, in dry and finely divided form, is mixed with powdered sugar, and the mixture in dry condition is added to the liquor in the melangeur and while the melangeur is in operation. A slight quantity of water (0.65 to 0.70%) is then added, and after an interval of from 15 to 30 minutes, when the added gelatine has been well incorporated, the cocoa butter is added,— which cocoa butter addition may be relatively less in quantity than hitherto has been deemed necessary, but it must in any case be sufficient to bring the total fat content to approximately 30% as a minimum. The operation of the melangeur then continues to effect thorough mixing, preferably for about two hours. The mass then is removed to a hot room and maintained there for about 15 hours at a temperature of about 140° F. It then is passed through the refining rolls, and after that is finished in the melangeur.

Edible gelatine varies widely in grade or quality. We preferably employ gelatine made from calf stock, as neutral as possible in the matter of acidity, and of relatively high gel strength and viscosity. The higher the gel strength the less the quantity of gelatine required. We find it desirable to employ the gelatine when comminuted to such degree of fineness as to pass through a 60-mesh sieve.

The quantity of sugar added to a given quantity of chocolate liquor will of course be determined independently of our invention. As we have said, we mix the gelatine with sugar, and we have found it convenient to mix together the whole of the quantities of gelatine and sugar, and then to introduce the mixture into the melangeur. The quantity of cocoa butter added is variable, but, as we have said, it may be less in the practice of our invention than otherwise would be found necessary, but must be sufficient to result in an article whose fat content is at least approximately 30%.

The product of our improved process, when compared with the product of the usual process not involving the use of gelatine, possesses these characteristics: Plasticity is increased, and in consequence the covering power is increased, actually by as much as 5 to 10%. Crystallization of sugar is retarded, and in consequence the tendency to granulation is diminished. The product of our improved process is superior in smoothness of body, and because of such smoothness of body the milling time may be reduced to an extent as great as one half while the quality of the product is maintained. The surface of the coated confection or other coated article is of smoother and more glossy appearance. Both sugar blooming and fat blooming are retarded. And the retardation of fat blooming is particularly noticeable if the sugar content be high.

The chocolate liquor upon which the invention is in the foregoing description carried out is an emulsion of cocoa, a solid substance in finely divided condition, in a fat. At ordinary temperatures it is solid, but at the temperature of operation indicated, it is a thick liquid, and in the industry it is called chocolate liquor. It is not essential to the practice of the invention that sugar be incorporated with the chocolate liquor in its preparation. The invention may be practiced by adding to the chocolate liquor gelatine alone, though in solid state and in finely divided condition, and by effecting thorough mixture in the manner described.

Debased preparations are known, formed by separating the cocoa and the cocoa butter which together constitute chocolate in the proper sense of the term, and by then combining with the cocoa another fat of inferior grade, quality, and flavor. Such debased preparations resemble true chocolate in appearance and approximate true chocolate in flavor, and in popular usage are not distinguished, but are called chocolate also. These debased preparations are susceptible to the practice of our invention, and by like procedure. The substance is rendered liquid by heat, gelatine in solid form and finely divided condition is added, and thorough mixing is effected, with such slight addition of water as has been indicated.

We claim as our invention:

1. The method herein described of preparing a non-blooming chocolate coating material which consists in incorporating with a body of chocolate whose fat content is as great as 30% as a minimum gelatine to the amount of 3.5% as a maximum.

2. The method herein described of preparing a non-blooming chocolate coating material which consists in bringing a quantity of chocolate liquor to the approximate temperature of 115° F., introducing to said liquor and in solid and finely divided condition gelatine in an amount not greater than 3.5% of the whole, mixing the substances so brought together, adding to the mixture as the mixing operation proceeds a quantity of water not greater than .70% of the whole, adding fat in sufficient quantity to bring the fat content of the mixture approximately to 30%, then increasing the temperature to approximately 140° F. and maintaining such increased temperature for approximately 15 hours.

3. The method herein described of preparing a non-blooming chocolate coating material which consists in bringing a quantity of chocolate liquor whose fat content is as great as 30% as a minimum to the approximate temperature of 115° F., mixing with the heated chocolate liquor a quantity of comminuted gelatine in solid form and finely divided condition and in an amount ranging from .3% to 3.5%, adding water in a quantity less than 1%, and continuing the mixing operation, then raising the temperature to and maintaining it for a period of approximately 15 hours at approximately 140° F.

4. An edible coating material consisting of an emulsion of a solid in a fat, the fat content of the emulsion being as great as 30% as a minimum, such emulsion being rendered viscous by the incorporation in its substance of gelatine.

In testimony whereof we have hereunto set our hands.

LEWIS B. ESMOND.
WERNER W. DUECKER.